United States Patent
Zierz et al.

(10) Patent No.: US 7,677,981 B2
(45) Date of Patent: Mar. 16, 2010

(54) SEALED JOINT ASSEMBLY

(75) Inventors: Michael Zierz, Freiensteinau (DE); Friedhelm John, Mühlheim (DE); Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 314 days.

(21) Appl. No.: 11/673,215

(22) Filed: Feb. 9, 2007

(65) Prior Publication Data

US 2007/0191121 A1    Aug. 16, 2007

(30) Foreign Application Priority Data

Feb. 10, 2006    (DE) .................. 10 2006 006 441

(51) Int. Cl.
*F16D 3/84* (2006.01)
(52) U.S. Cl. .................. 464/173; 464/906; 29/235
(58) Field of Classification Search ......... 464/634–636, 464/140–146, 173, 906; 29/234, 235, 244, 29/271, 272, 280, 281.1, 282; 277/634–636
See application file for complete search history.

(56) References Cited

U.S. PATENT DOCUMENTS

| 3,553,817 | A | * | 1/1971 | Lallak ................ 29/235 X |
| 3,707,027 | A | * | 12/1972 | Davis et al. |
| 4,281,487 | A | * | 8/1981 | Koller |
| 4,821,398 | A | * | 4/1989 | Hillstead ............ 29/235 X |
| 5,353,489 | A | * | 10/1994 | Weaver ................ 29/235 X |
| 5,564,177 | A | * | 10/1996 | Fernandes et al. |
| 5,956,830 | A | * | 9/1999 | Imbus et al. ........... 29/235 X |
| 6,685,377 | B2 | * | 2/2004 | Nakata et al. |

FOREIGN PATENT DOCUMENTS

| CN | 101128681 | | 2/2008 |
| DE | 102005036789 | | 2/2007 |
| DE | 102005036789 | * | 8/2007 |
| FR | 2882013 | * | 8/2006 |
| WO | 2006037389 A1 | | 4/2006 |

OTHER PUBLICATIONS

U.S. Publication No. 20080167134 is a published application relating to CN 101128681.

* cited by examiner

*Primary Examiner*—Greg Binda
(74) *Attorney, Agent, or Firm*—Rader, Fishman & Grauer PLLC

(57) ABSTRACT

A sealed joint assembly includes an outer joint part (3) with outer ball tracks (9), an inner joint part (4) with inner ball tracks (10), torque transmitting balls (6) which are guided in pairs of tracks and held in a cage (7) with cage windows (8). A sleeve (16) is connected to the inner joint part (4) and is coaxially arranged thereto. A sealing mechanism (12) with an annular cap (13) is fixed to the outer joint part (3) and includes a sealing diaphragm (15) with an outer collar (18) connected to the annular cap (13) and an inner collar (19) sealingly connected to the sleeve (16). A securing ring (20) fixes the inner collar (19) on the sleeve (16). The sleeve (16) has an annular groove (33) which is engaged by the sealing diaphragm (15) by an inner annular bead (32) formed on the inner collar (19).

14 Claims, 7 Drawing Sheets

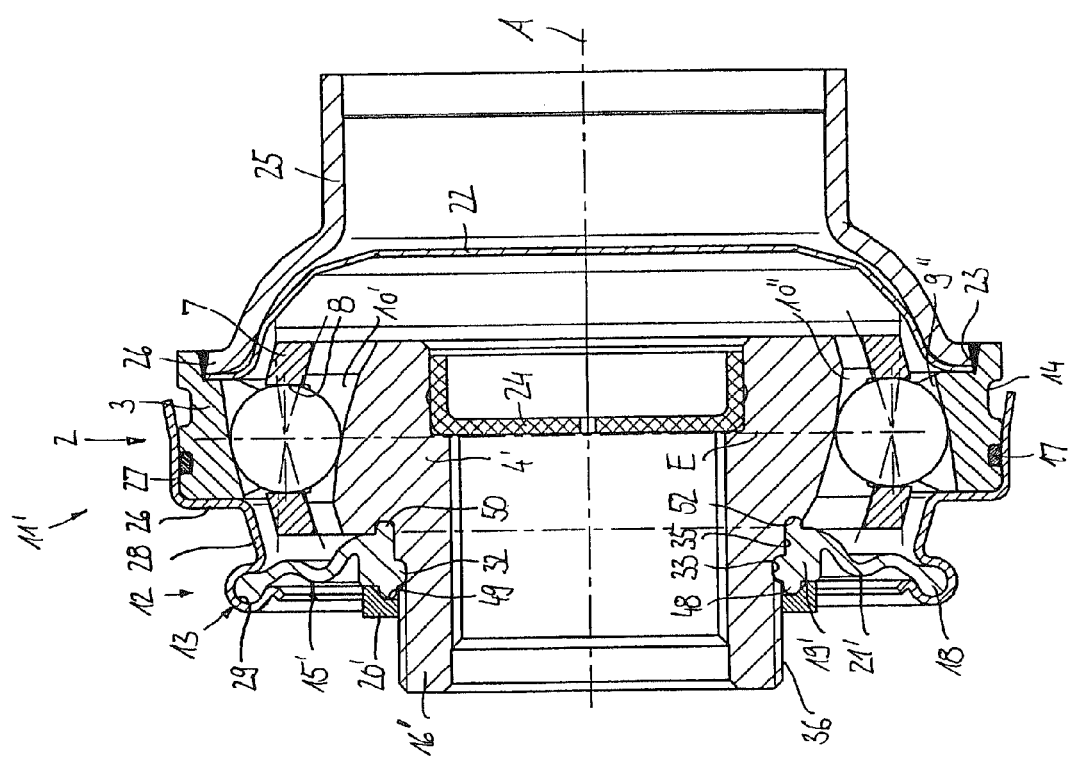

SEALED JOINT ASSEMBLY

TECHNICAL FIELD

The invention relates to a joint assembly with improved sealing and to a device for mounting the seal on a constant velocity universal joint. The joint assembly, more particularly, can be used in a high-speed propeller shaft of a motor vehicle. The joint assembly can be provided at one end of the propeller shaft for being connected to a manual gearbox or an axle drive. The joint assembly can also be used as a connecting member between two shaft portions of a multi-part propeller shaft.

BACKGROUND OF THE INVENTION

In general, it is desirable to minimize any residual out-of-balance in driveshafts to improve driveline NVH dynamics Compact joint assemblies such as disclosed herein are often used in driveshafts for this reason. More particularly, this applies to high-speed driveshafts, for example propeller shafts of motor vehicles, wherein, due to the higher speeds, the residual out-of-balance has a greater effect than in slow-running driveshafts such as the sideshafts of motor vehicles. Furthermore, even though such joint assemblies have a compact size, it must be ensured that they are securely sealed towards the outside at high operational speeds.

WO 2006/037389 A1 discloses a connecting assembly used between a shaft journal and a constant velocity universal joint. The connecting assembly comprises a threaded sleeve which is connected to the inner joint part on the one side, and to the shaft journal on the other side. A diaphragm boot is provided for sealing the joint chamber which, by means of an inner collar, is positioned on the cylindrical outer face of the threaded sleeve and which is fixed by a securing ring.

DE 10 2005 036789 proposes a drive assembly of a multi-part driveshaft. The drive assembly comprises an intermediate bearing, a constant velocity universal joint, a shaft journal connected to the inner joint part of the constant velocity universal joint and a diaphragm boot for sealing the joint chamber. The diaphragm boot comprises an inner collar by which it engages an annular groove of an intermediate sleeve held on the shaft journal. The inner collar is secured by a securing ring on the intermediate sleeve.

There still exists a need for an improved sealed joint assembly, having a compact design and reliable sealing, even at high speeds.

SUMMARY OF THE INVENTION

The present invention provides an improved joint assembly with a seal which has a compact design and which even at high speeds has a reliable sealing effect. A device for mounting the seal on a constant velocity joint is also provided, which device has a simple design and permits a reliable mounting procedure.

In one aspect of the invention, a sealed joint assembly for use in a driveshaft of a motor vehicle includes a constant velocity joint with an outer joint part with outer ball tracks, an inner joint part with inner ball tracks, torque transmitting balls which are guided in pairs of tracks each consisting of an outer ball track and an inner ball track, and a cage with cage windows in which the balls are received and held in a common plane. A sleeve is firmly connected to the inner joint part and is coaxially arranged thereto. A sealing mechanism with an annular cap is fixed to the outer joint part, and a sealing diaphragm which, by means of an outer collar, is firmly connected to the annular cap and which, by means of an inner collar, is sealingly connected to the sleeve. A securing ring fixes the inner collar on the sleeve, and the sleeve comprises a continuous annular groove which is engaged by the sealing diaphragm by means of an inner annular bead formed on the inner collar.

An advantage of the inventive joint assembly is that, due to the sealing mechanism with a sealing diaphragm, it is axially very compact. Furthermore, the unique shape of the sealing diaphragm ensures that, even at high speeds such that occur in the propeller shaft in the driveline of a motor vehicle, it is securely fixed on the sleeve and reliably seals the joint chamber. As a result of the annular bead of the sealing diaphragm engaging the outer annular groove of the sleeve, there is achieved a positive, form-fitting connection between said components. It is thus ensured that the inner collar cannot move outwardly because of centrifugal forces. In one embodiment, the sleeve is provided in the form of a sleeve projection produced so as to be integral with the inner joint part.

According to a further embodiment, the securing ring is produced in the form of a continuously closed wire ring which is positioned on an outer face of the inner collar. This achieves an assembly which is particularly short in the axial direction, with the inner collar being securely fixed on the sleeve. On its outer face, the inner collar can comprise a continuous annular recess which is engaged in a positive and form-fitting way by the securing ring. In the axial direction, in the region of the annular bead, the inner collar comprises a greater thickness than in the region of the recess which is engaged by the securing ring. The thickening produced in this way prevents the inner collar from being pulled radially outwardly as a result of high centrifugal forces. The recess for the securing ring can be arranged so as to axially adjoin the inner annular bead and partially axially overlaps with same respectively.

According to another embodiment, the securing ring is provided in the form of a continuously closed L-ring which is fixed on the sleeve and which at least partially embraces the inner collar on the outside. For this purpose, the L-ring, on its radial outside, comprises a continuous axial web, forming a recess, which partially axially covers the inner collar. The inner collar, at an end face facing away from the inner joint part, can comprise an axial annular bead which is embraced by the outer web of the securing ring. This measure ensures that the inner collar is securely radially fixed at its end facing away from the joint. To ensure a higher degree of stiffness of the inner collar it is advantageous for the latter to be solid, filling an annular space formed axially between the securing ring and the inner joint part.

According to one aspect of the invention which applies to both embodiments just mentioned, the inner collar, at an end face facing the inner joint part, comprises an annular bead which form-fittingly engages an annular groove formed in the end face of the inner joint part. This is advantageous that, in the connecting region of the diaphragm part where, due to high speeds, there occur high outwardly directed radial forces, the inner collar is securely fixed relative to the inner joint part. The inner annular bead preferably extends over only part of the axial extension of the inner collar. For reliably connecting the collar to the sleeve it is advantageous if the inner annular bead and the diaphragm part outwardly adjoining the inner collar are arranged at opposed ends of the collar, with the inner annular bead being formed at a first axial end of the inner collar, which axial end is positioned remote from the inner joint part; whereas the diaphragm part is formed on to a second end of the inner collar, which second end faces the inner joint part.

According to another aspect, the annular cap comprises a continuous beading which is open towards the inside and which is form-fittingly engaged by the sealing diaphragm by means of its outer collar. Furthermore, the annular cap comprises a cylindrical portion which extends over the outer joint part and whose end is form-fittingly formed into an annular groove of the outer joint part. The annular cap can be formed in such a way that the beading which is form-fittingly engaged by the outer collar comprises a greater axial distance from a central joint plane than the inner collar in the region of connection to the diaphragm part from said central joint plane. Furthermore, the diaphragm part can comprise an undulating shape in the region between the inner collar and the outer collar; more particularly, it is S-shaped. This ensures that in the case of centrifugal forces occurring as a result of rotation, the diaphragm part closely rests against the inside of the annular cap. The diaphragm part is prevented from being inflated or torn, so that secure sealing conditions are ensured.

In a portion axially adjoining the annular groove, the sleeve can comprise an outer thread for receiving a union nut. By means of the threaded connection formed in this way, the joint assembly can be axially attached to an axle differential. To ensure simple and cost-effective production conditions, it is advantageous for the sleeve and sleeve projection respectively to be produced in one piece. Of course, the sleeve can also first be produced as a separate part and subsequently firmly connected to the inner joint part.

The constant velocity universal joint can be provided in the form of a counter track joint which will be described below in greater detail. The constant velocity universal joint can of course also be provided in the form of other fixed joints, for example UF-joints (undercut-free) and RF joints (Rzeppa fixed joint). Plunging joints, too, with a delimited plunge of up to 3 mm can also be used in the inventive joint assembly.

A further solution provides a device for mounting the sealing mechanism on a joint assembly according to any one of the above-mentioned embodiments, comprising a mounting sleeve with a central aperture whose inner diameter is such that the mounting sleeve can be slid on to the sleeve, wherein the annular groove is covered by the mounting sleeve; a slidable sleeve with an end face which can be axially displaced on the mounting sleeve, wherein the inner collar of the sealing diaphragm is displaced from the end face of the slidable sleeve during the displacement of same towards the inner joint part on the mounting sleeve and thus slid on to the sleeve; wherein, after the sealing diaphragm has been slid on to the sleeve, the mounting sleeve is retractable, wherein the annular groove is released and the inner annular bead snaps into the annular groove.

According to one embodiment, the mounting sleeve comprises a first portion with a lesser wall thickness to be slid on to the sleeve and an axially adjoining second portion with an inwardly widened greater wall thickness. The inner diameter of the central aperture approximately corresponds to the outer diameter of a sleeve portion formed between the end face of the sleeve and the annular groove, and the outer diameter of the mounting sleeve approximately corresponds to the outer diameter of a sleeve portion formed between the annular groove of the sleeve and an end face of the inner joint part. In this way it is ensured that the inner collar can be slid over the outer face of the mounting sleeve stepplessly over the annular groove on to the sleeve. When mounting the sealing mechanism in accordance with the above-mentioned embodiment, the securing ring is inserted into the outer annular groove of the inner collar preferably prior to the inner collar being mounted on the mounting sleeve.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

FIG. 7 is a longitudinal section through an inventive joint assembly in a second embodiment.

DETAILED DESCRIPTION OF THE DRAWINGS

Figure 1:
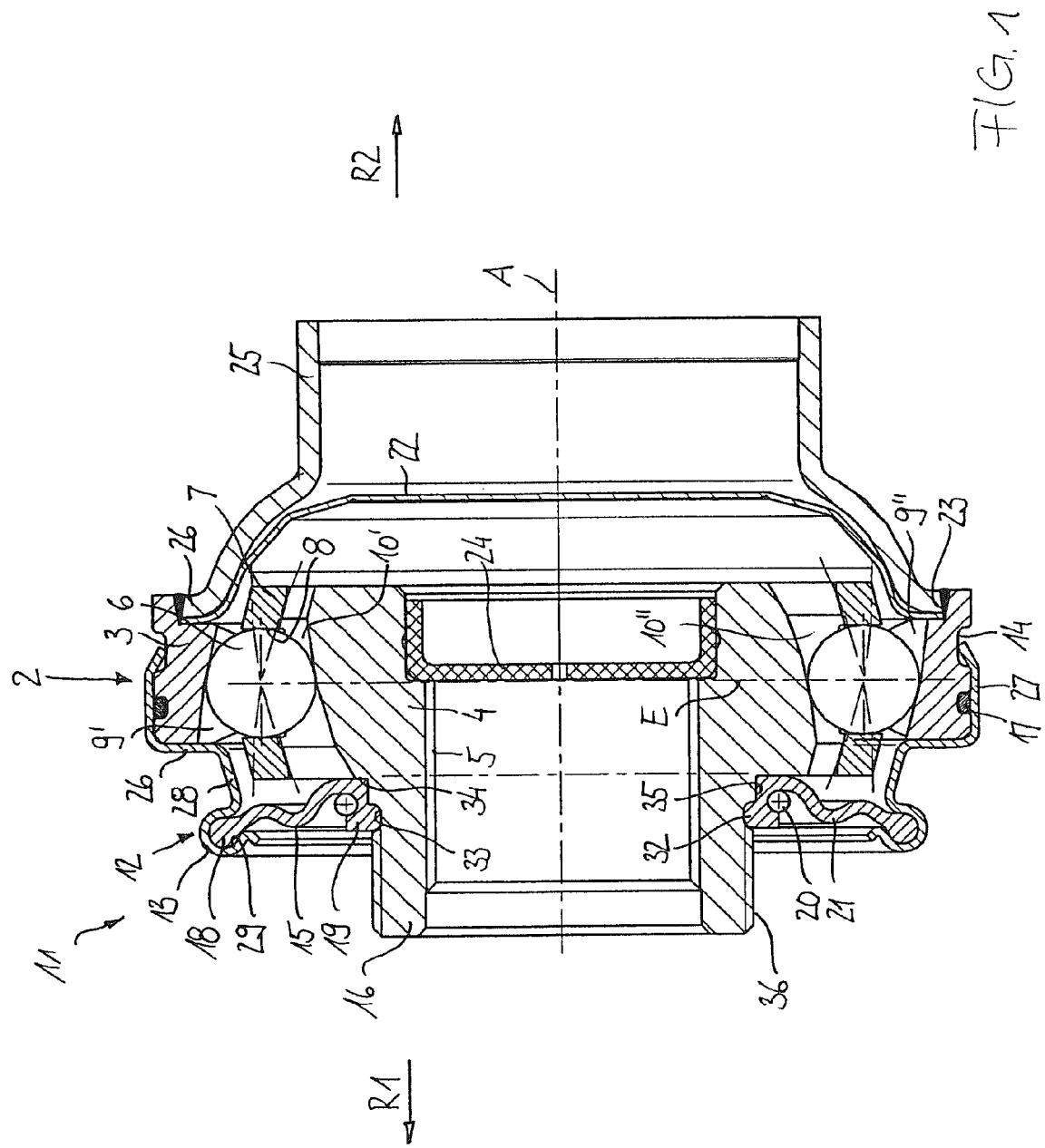
FIG. 1 is a longitudinal section through an inventive joint assembly in a first embodiment.
Figure 2:
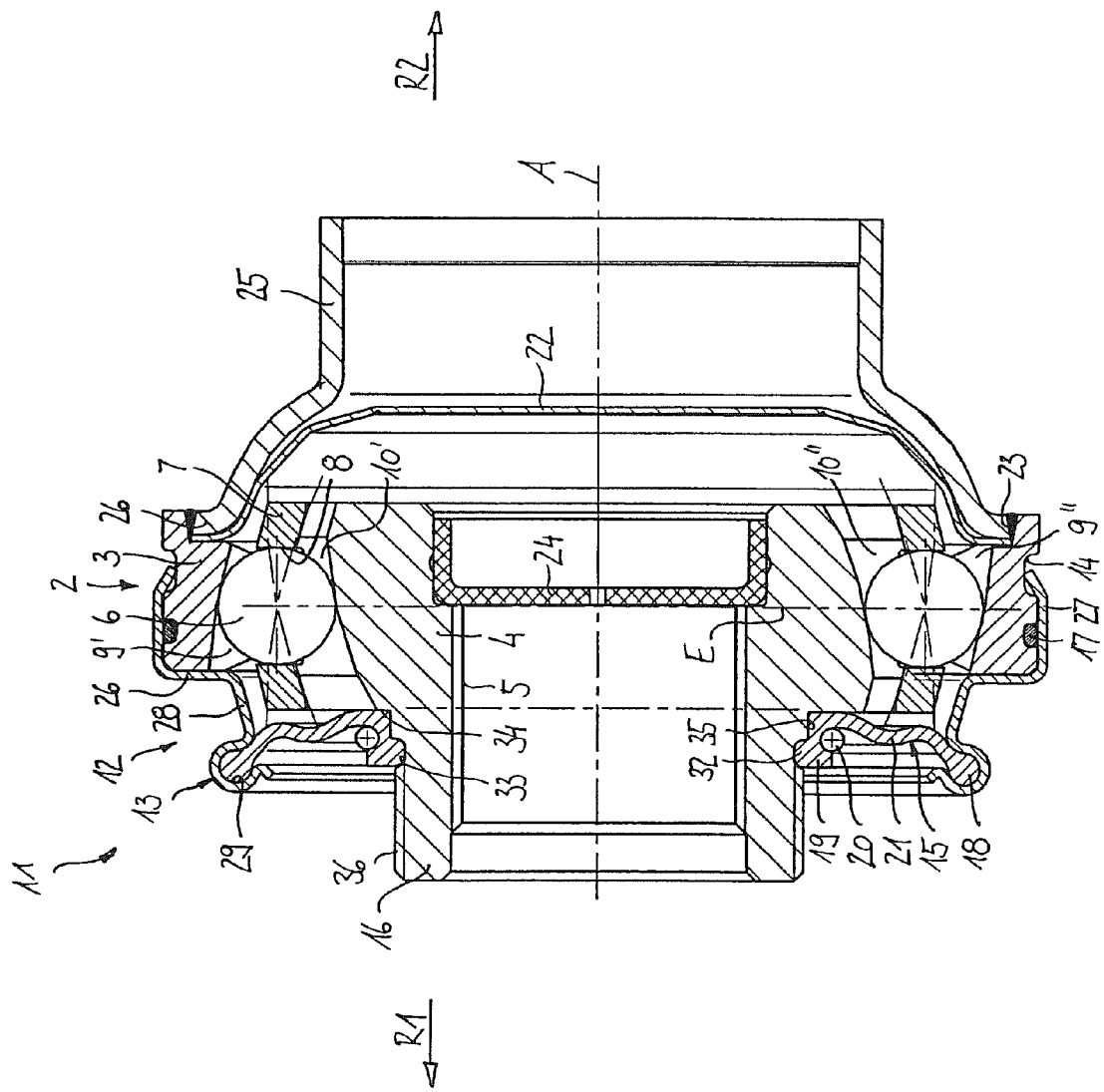
FIG. 2 shows the joint assembly according to FIG. 1, rotating around the longitudinal axis.

FIGS. 1 and 2 showing a joint assembly 11 with a sealing mechanism 12 will be described jointly below. The joint assembly 11 comprises a constant velocity joint 2 having an outer joint part 3, an inner joint part 4 with an insertion aperture 5 for a journal, balls 6 and a ball cage 7 with cage windows 8 in which the balls 6 are held in a central joint plane E. The constant velocity joint 2 is provided in the form of a counter track joint, i.e. outer first ball tracks 9' in the outer joint part 3 and inner first ball tracks 10' in the inner joint part 4 axially extend in opposite directions relative to outer second ball tracks 9" in the outer joint part 3 and inner second ball tracks 10" in the inner joint part 4. The first pairs of tracks 9', 10' formed in this way have control angles which open in a first direction R1, whereas the second pairs of tracks 9''', 10" have control angles which open in a second direction R2. The counter track formation is achieved in that the centers of curvature of the track center lines which extend parallel to the illustrated track base lines are offset in each of the joint parts 3, 4 in such a way that they alternate around the circumference in opposed axial directions relative to the joint center plane E. The joint center plane E is defined by the centers of the balls 6 when the joint is in the aligned condition. The number of torque transmitting balls 6 and cage windows is shown as ten, but, of course, it is also possible to use a different number of balls and cage windows such as six, eight or twelve.

The counter track joint 2 is provided in the form of a disc-shaped joint, which mechanism that the outer joint part 3 is open in both directions R1, R2. In the first direction R1, the counter track joint 2 is sealed towards the outside by a sealing mechanism 12. In the second direction R2, the counter track joint 2 is sealed by a cover 22 which, by means of an outer flange portion, is held in a recess 23 of the outer joint part 3. Furthermore, there is provided an inner cover 24 which is sealingly received in the insertion aperture 5 of the inner joint part 4. An attachable hollow shaft 25, which is inserted by means of a flange portion 26 into the recess 23, is connected to the outer joint part 3 by welding. To that extent, the joint illustrated is particularly suited to be used in a one-part or multi-part driveshaft. A sleeve 16 which serves to be connected to a connecting part is integrally formed on to the inner joint part 4.

The sealing mechanism 12 comprises an annular cap 13 which can be produced in the form of a formed sheet metal part and comprises a sealing diaphragm 15. The annular cap 13 comprises a cylindrical portion 27 which is slid on to the outer joint part 3 and whose end is beaded. The beaded collar formed in this way positively and form-fittingly engages a continuous annular groove 14 of the outer joint part 3. The annular cap 13 is sealed relative to the outer joint part 3 by a sealing ring 17 which is positioned in a further annular groove of the outer joint part 3 in the region of overlap with the cylindrical portion 27. In the region adjoining the cylindrical portion 27, the annular cap 13 comprises a radial portion 26 contacting an end face of the outer joint part 3, and an adjoining conical portion 28 whose end is beaded in order to form a beading 29 with an undercut portion.

By means of its outer collar 18 formed as an annular bead, the sealing diaphragm 15 form-fittingly engages the beading 29. The sealing diaphragm 15 furthermore comprises an inner collar 19 which is sealingly fixed on the sleeve 16 by a sealing ring 20, as well as a diaphragm part 21 connecting the two collars 18, 19 to one another. The diaphragm part 21 is shaped in such a way that it forms an undulating, more particularly, S-shaped annular fold between the inner collar 19 and the outer collar 18. The inner collar 19, on its inside, comprises an annular bead 32 by which it engages an outer annular groove 33 of the sleeve 16. The sleeve 16 which can be produced so as to be integral with the inner joint part 4, comprises a cylindrical first sleeve portion 35 which starts from the end face of the inner joint part 4 and which is delimited by a shoulder which forms a side face of the annular groove 33. In the region adjoining the annular groove 33, the sleeve 16 comprises a second sleeve portion 36 with an outer thread which serves to provide a connection with an attachable part, for example an axle differential.

The annular cap 13 comprises a continuous beading 29 which is open towards the inside and which is form-fittingly engaged by the sealing diaphragm 15 by means of its outer collar 18. Furthermore, the annular cap 13 comprises a cylindrical portion 27 which extends over the outer joint part 3 and whose end is form-fittingly formed into an annular groove 14 of the outer joint part 3. The annular cap can be formed in such a way that the beading 29 which is form-fittingly engaged by the outer collar 18 comprises a greater axial distance from a central joint plane E than the inner collar 19 in the region of connection to the diaphragm part from said central joint plane.

The inner collar 19 extends from the end face 34 of the inner joint part 4 to the second sleeve portion 36. The collar 19, on its outer face, approximately in the center between its two axial ends, comprises a continuous recess which is engaged by the securing ring 20. The securing ring 20 can be a closed wire ring. The securing ring 20 is positioned on an outer face of the inner collar 19. In the axial direction, in the region of the annular bead 32, the radial wall thickness of the inner collar 19 is thus greater than the wall thickness between the securing ring 20 and the cylindrical portion 35. In the case of centrifugal forces occurring as a result of rotation—because of the annular bead 32 and the selected wall thickness conditions—the inner collar 19 is securely held on the sleeve 16 of the inner joint part 4. The recess for the securing ring 20 can axially adjoin the inner annular bead 32 and partially axially overlap same. The S-shaped diaphragm part 21 adjoins the collar 19 in the region of the first sleeve portion 35, i.e. at the joint end.

FIG. 2 shows the joint assembly 11 while rotating at high speeds. It can be seen that the S-shaped annular fold of the diaphragm part 21 has moved radially outwardly and that the outer portion of the diaphragm part 21 adjoining the outer annular bead 18 rests closely against the annular cap 13. Because of the conical portion 28 of the annular cap 13, the outer annular bead 18 is held at a greater axial distance from the joint center plane than the inner annular bead 19, more particularly in the region of connection to the diaphragm part 21. In this way, it is ensured that, when the joint assembly rotates, the sealing diaphragm 15 closely rests against the inside of the annular cap 28 while keeping an axial distance from the cage 7. In this way, the sealing mechanism achieves a long service life.

FIGS. 3 to 6 which will be described jointly below show a device for mounting the sealing mechanism 12 on the constant velocity universal joint 2, as well as the mounting sequence.

The device comprises a tubular mounting sleeve 42 having a thin-walled first portion 43 with a central aperture 44 as well as an axially adjoining second portion 45 whose radially inwardly widened wall comprise a greater wall thickness. The inner diameter (d) of the bore 44 is greater than the outer diameter (D2) of the second sleeve portion 36, so that the mounting sleeve 42, by its first portion 43, which is coaxially aligned relative to the inner joint part 4, can be slid on to the sleeve 16. The diameter ratios (d) to (D2) are such that the mounting sleeve 42 can be slid on to the sleeve 16 with the smallest possible play, so that the two components are centered relative to one another. The first sleeve portion 35 formed between the annular groove 33 and the end face 34 of the inner joint part 4 has a greater outer diameter (D1) than the inner diameter (d) of the bore 44, to provide an abutment in the form of a shoulder against which the mounting sleeve 42 is able to abut. The outer diameter (D1) of said sleeve portion 35 approximately corresponds to the outer diameter (D) of the mounting sleeve 42.

Furthermore, the device comprises a slidable sleeve 46 which, while being aligned coaxially relative to the mounting sleeve 42, can be axially displaced relative thereto. The outer diameter (D) of the mounting sleeve and the inner diameter of the slidable sleeve have been selected to be such that there is formed a small amount of play between the two sleeves 42, 46. Thus, they are substantially equal with the inner diameter of the slidable sleeve being only slightly greater than the outer diameter of the mounting sleeve. The slidable sleeve 46 comprises a radial end face 47 for axially displacing the inner collar 19 of the sealing diaphragm 15 along the mounting sleeve 42.

The assembly sequence is as follows: First, the sealing diaphragm 15 is formed into the recess 29 of the annular cap 13 and held by its outer collar 18. The securing ring 20 is slid on to the inner collar 19 and the unit formed in this way is slipped on to the cylindrical outer face of the mounting sleeve 42 in the thin-walled region.

Figure 3:
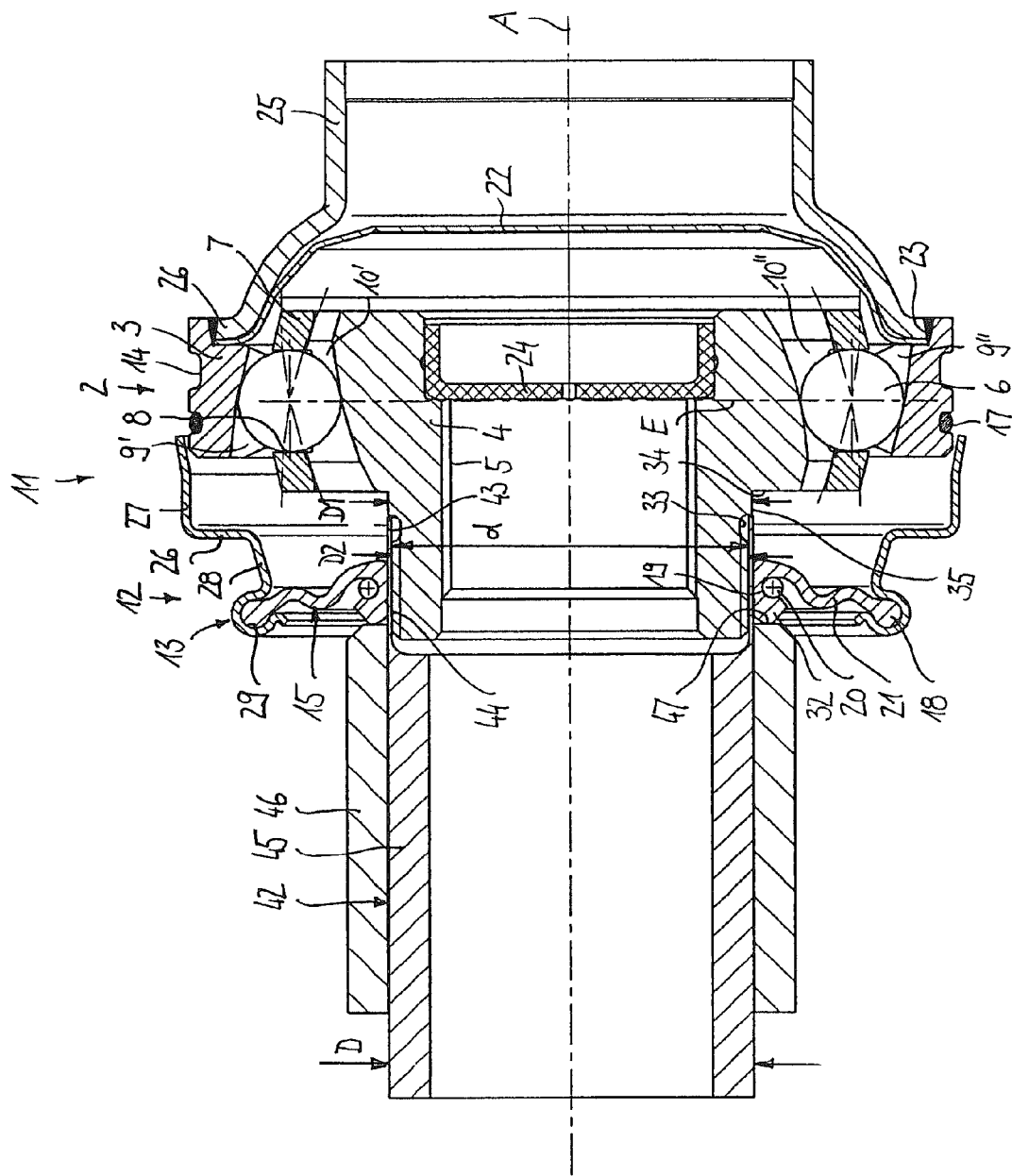
FIG. 3 is a longitudinal section of the joint assembly according to FIG. 1 with a mounting device during a first mounting stage.

Subsequently, the mounting sleeve 42 is slid axially on to the journal 16 until the end face of the thin-walled portion axially abuts the shoulder of the journal 16, thus covering the annular groove 33. This is illustrated in FIG. 3.

Figure 4:
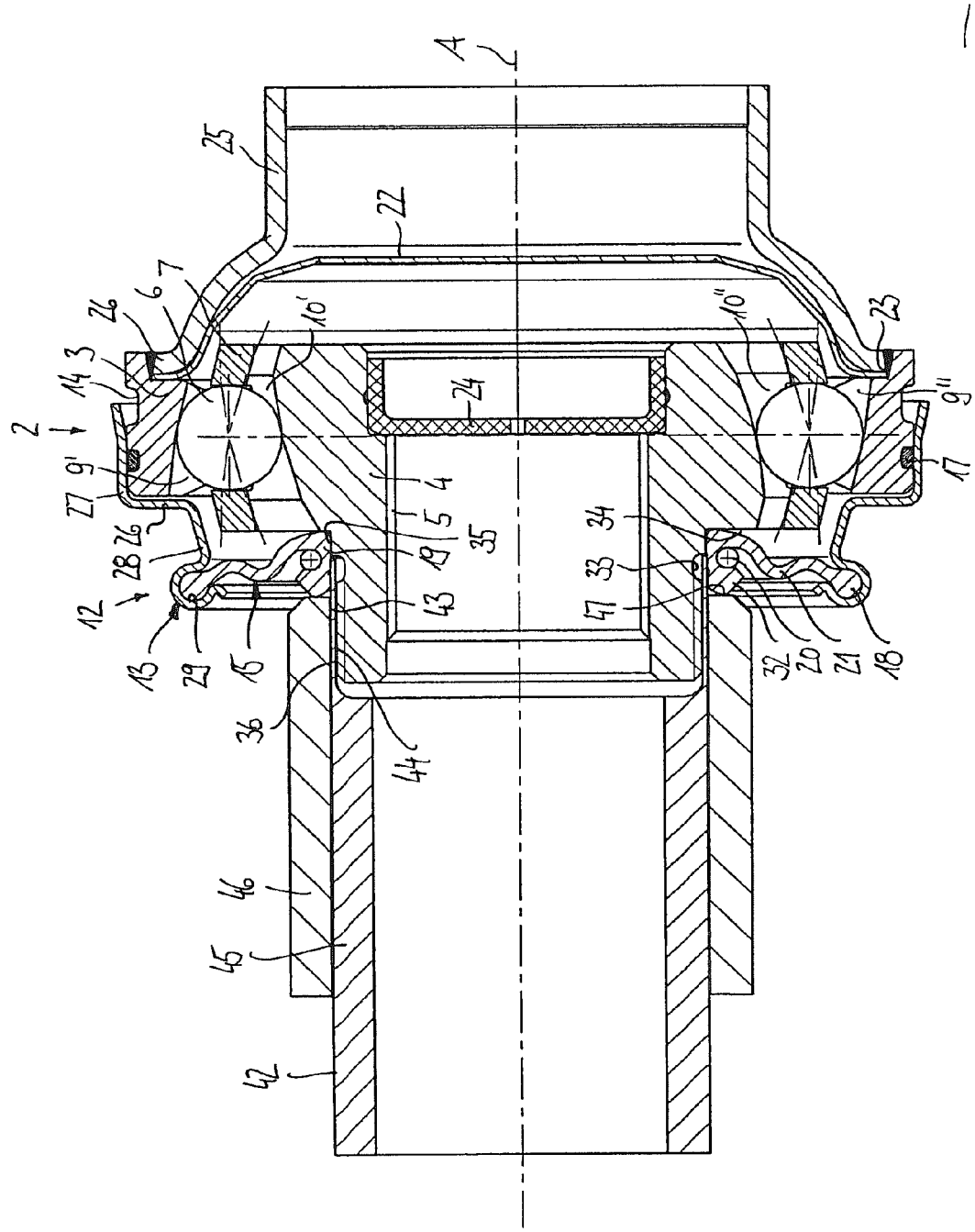
FIG. 4 is a longitudinal section through the joint assembly with a mounting device according to FIG. 3 during a second mounting stage.

During the next assembly stage, the slidable sleeve 46 is axially displaced along the mounting sleeve 42 towards the joint. As a result, the inner collar 19 with the sealing diaphragm 15 and the annular cap 13 is pressed by the end face 47 of the slidable sleeve 46 towards the joint 2. FIG. 4 shows an intermediate position during the insertion process, in which position the inner collar 19, by its end facing the joint, has just abutted the end face 34 of the inner joint part 4.

Figure 5:
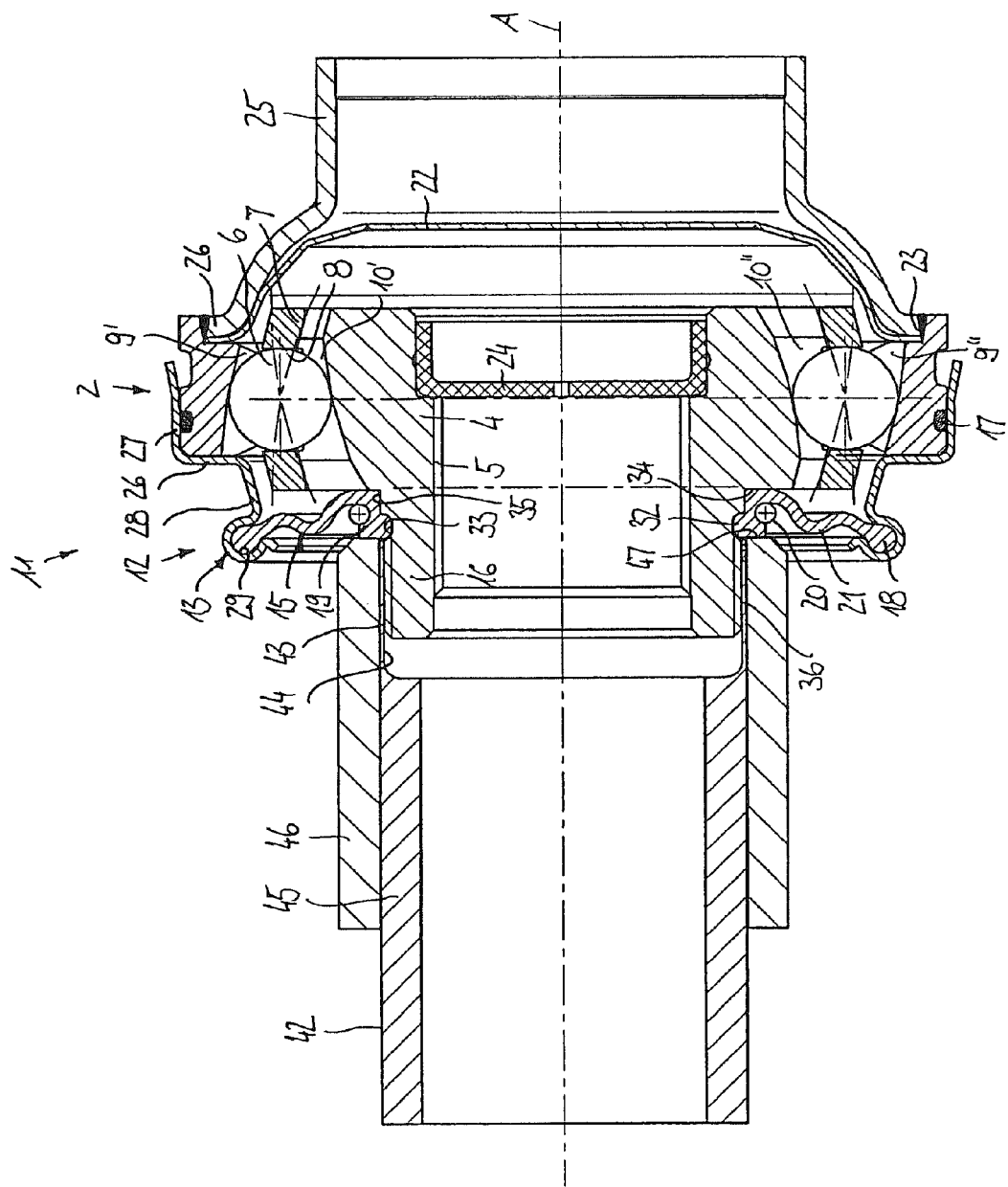
FIG. 5 shows the joint assembly with a mounting device according to FIG. 3 during a third mounting stage.

The slidable sleeve 46 is pushed towards the joint until the end face 47 is positioned substantially in one plane with a side face of the annular groove 33, which side face is remote from the joint. In this position, the inner collar 19 is partially positioned on the first sleeve portion 35 and partially on the mounting sleeve 42 at the joint end of same. Then the mounting sleeve 42 is pulled away underneath the slidable sleeve 46 in the direction R1 away from the joint, with the annular bead 32 of the inner collar 19 snapping into the annular groove 33 of the sleeve 16. This condition is illustrated in FIG. 5.

Figure 6:
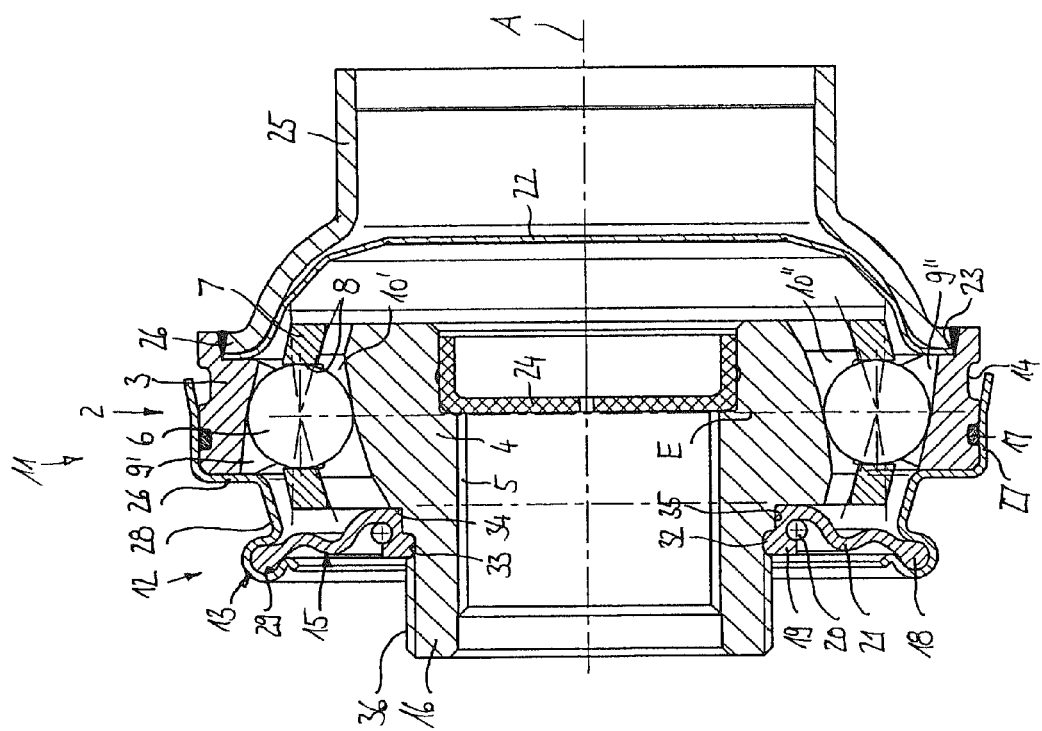
FIG. 6 is a longitudinal section through the joint assembly according to FIG. 3 during a fourth assembly stage.

Finally, the end of the cylindrical portion 27 of the annular cap 13, which end points in direction R2, is deformed, i.e. beaded or crimped, so that it form-fittingly and positively engages the annular groove 14. The annular cap 13 is thus axially and radially fixed to the outer joint part 3. The condition prevailing prior to the deformation of the annular cap 13 is shown in FIG. 6, whereas the finish-mounted joint assembly is illustrated in FIG. 1.

FIG. 7 shows an inventive joint assembly 11' in a second embodiment which, as far as design and assembly are concerned, largely corresponds to the embodiments illustrated in FIGS. 1 to 6 and to the description of which reference is hereby made. Identical components have been given identical reference numbers whereas the reference numbers of modified components have been provided with an apostrophe.

The present embodiment differs in respect of the design of the inner collar 19' of the sealing diaphragm 15'. It can be seen that instead of a securing ring positioned on an outer face of the inner collar, there is provided a securing ring 20' secured to the journal 16'. The securing ring 20' is provided in the form of a continuously closed L-ring which is fixed on the sleeve 16' and which at least partially embraces the inner collar 19' on the outside. For this purpose, the L-ring, on its radial outside, comprises a continuous axial web, forming a recess 49, which partially axially covers the inner collar 19'. After the sealing diaphragm 15' has been mounted, the securing ring 20' is slid on to the journal 16' and axially fixed by a fixing nut (not shown) to be threaded on to the journal 16'. Alternatively, the securing ring 20' can also be provided with an inner thread and threaded on to the outer thread of the journal 16'. At its end face facing away from the inner joint part 4', the inner collar 19' comprises an axial annular bead 48 which form-fittingly and positively engages an axial recess 49 of the securing ring 20'. At its end face facing the inner joint part 4', the inner collar 19' comprises a further axial annular bead 50 which form-fittingly and positively engages an annular groove 52 formed in the end face 34 of the inner joint part 4'. In this way, the inner collar 19', by means of its two axial projections 48, 50, is radially fixed at the two axially opposed ends, so that, when there occur centrifugal forces, the inner collar 19' is securely held on the sleeve 16'. As an additional safety measure to prevent unfastening, the radially inwardly directed annular bead 32 engages the annular groove 33 of the sleeve 16. The inner collar 19' is solid and completely fills the annular chamber axially formed between the securing ring 20' and the inner joint part 4'.

The above assembly sequence analogously corresponds to that described in connection with FIGS. 2 to 6 to the description of which reference is hereby made. The only difference is that, in the present embodiment, the securing ring 20' is mounted only after the inner collar 19' has been slipped on to the journal 16'.

While the invention has been described in connection with several embodiments, it should be understood that the invention is not limited to those embodiments. Rather, the invention covers all alternatives, modifications, and equivalents as may be included in the spirit and scope of the appended claims.

What is claimed is:

1. A sealed joint assembly for use in a driveshaft of a motor vehicle, comprising:
   a constant velocity joint with an outer joint part having outer ball tracks, an inner joint part having inner ball tracks, torque transmitting balls which are guided in pairs of tracks each consisting of an outer ball track and an inner ball track, and a cage with cage windows in which the balls are received and held in a common plane;
   a sleeve which is firmly connected to the inner joint part and is coaxially arranged thereto; and
   a sealing mechanism comprising an annular cap fixed to the outer joint part, a sealing diaphragm which, by an outer collar, is firmly connected to the annular cap and which, by an inner collar, is sealingly connected to the sleeve, and a securing ring for fixing the inner collar on the sleeve;
   wherein the sleeve comprises a continuous annular groove which is engaged by the sealing diaphragm by an inner annular bead formed on the inner collar;
   wherein the securing ring comprises a continuously closed wire ring which is positioned on an outer face of the inner collar;
   wherein, at its outer face, the inner collar comprises a continuous recess which is form-fittingly engaged by the securing ring; and
   wherein, in the region of the annular bead, the inner collar comprises a greater thickness than in the region of the recess which is engaged by the securing ring.

2. A joint assembly according to claim 1, wherein the inner annular bead and a diaphragm part adjoining an outside surface of the inner collar are arranged at axially opposed ends of the inner collar.

3. A joint assembly according to claim 2, wherein the inner annular bead is formed at a first axial end of the inner collar which faces away from the inner joint part, and the diaphragm part is formed at a second end of the inner collar which faces the inner joint part.

4. A joint assembly according to claim 1, wherein the annular cap comprises a continuous, inwardly opening crimping which is form-fittingly engaged by the outer collar of the sealing diaphragm.

5. A joint assembly according to claim 4, wherein the sealing diaphragm includes an S-shaped diaphragm part between the inner and outer collars, and the annular cap crimping which engages the outer collar is at a greater axial distance from a joint center plane (E) than the inner collar in its connecting region to the diaphragm part.

6. A joint assembly according to claim 1, wherein the sleeve comprises an outer thread for receiving a union nut in a portion axially adjoining the annular groove.

7. A joint assembly according to claim 1, wherein the sleeve and the inner joint part are produced so as to form a unitary piece.

8. A joint assembly according to claim 1, wherein the sealing diaphragm comprises an undulating shape between the inner collar and the outer collar.

9. A device for mounting a sealing mechanism on a joint assembly having a constant velocity joint with an outer joint part having outer ball tracks, an inner joint part having inner ball tracks, torque transmitting balls which are guided in pairs of tracks each consisting of an outer ball track and an inner ball track, and a cage with cage windows in which the balls are received and held in a common plane, a sleeve which is firmly connected to the inner joint part and is coaxially arranged thereto, and a sealing mechanism comprising an annular cap fixed to the outer joint part, a sealing diaphragm which, by an outer collar, is firmly connected to the annular cap and which, by an inner collar, is sealingly connected to the sleeve, and a securing ring for fixing the inner collar on the sleeve, the sleeve having a continuous annular groove that is engaged by the sealing diaphragm by an inner annular bead formed on the inner collar, the mounting device comprising:

- a mounting sleeve with a central aperture whose inner diameter is such that the mounting sleeve can be slid onto the sleeve, wherein the annular groove is covered by the mounting sleeve, the mounting sleeve comprises a first portion with a lesser wall thickness to be slid on to the sleeve and an axially adjoining second portion with a radially inwardly widened greater wall thickness, an end of the first portion for engaging an end face of the inner joint part when the mounting sleeve is fully engaged with the sleeve;
- a slidable sleeve with an end face which can be axially displaced on the mounting sleeve, wherein the inner collar of the sealing diaphragm is displaced from the end face of the slidable sleeve during the displacement of same towards the inner joint part on the mounting sleeve and thus slid on to the sleeve;
- wherein, after the sealing diaphragm has been slid on to the sleeve, the mounting sleeve is retractable, wherein the annular groove is released and the inner annular bead snaps into the annular groove.

10. A device according to claim 9, wherein the inner diameter of the central aperture approximately corresponds to the outer diameter of a second sleeve portion formed between the end face of the sleeve and the annular groove, and that the outer diameter of the mounting sleeve approximately corresponds to the outer diameter of a sleeve portion formed between the annular groove of the sleeve and an end face of the inner joint part.

11. A device according to claim 9, wherein the second portion of the mounting sleeve is displaced away from the sleeve when the first portion of the mounting sleeve is engaged with the end face of the inner joint part.

12. A sealed joint assembly for use in a driveshaft of a motor vehicle, comprising:

- a constant velocity joint with an outer joint part having outer ball tracks, an inner joint part having inner ball tracks, torque transmitting balls that are guided in pairs of tracks each consisting of an outer ball track and an inner ball track, and a cage with cage windows in which the balls are received and held in a common plane;
- a sleeve connected to the inner joint part and coaxially arranged thereto; and
- a sealing mechanism comprising an annular cap fixed to the outer joint part, a sealing diaphragm which, by an outer collar, is firmly connected to the annular cap and which, by an inner collar, is sealingly connected to the sleeve, and a securing ring for fixing the inner collar on the sleeve, the inner collar comprising a continuous recess at its outer face that is form-fittingly engaged by the securing ring; and
- wherein the sleeve comprises a continuous annular groove and the sealing diaphragm comprises an inner annular bead formed on the inner collar that engages the annular groove, the inner collar having a greater radial wall thickness in the region of the annular bead than in the region of the recess that is engaged by the securing ring.

13. A joint assembly according to claim 12, wherein the annular groove includes a first corner edge and a second corner edge arranged on an opposite side of the annular groove, the first corner edged arranged closer to a central joint plane E than the second corner edge, the recess engaged by the securing ring includes a third corner edge and a fourth corner edge arranged on an opposite side of the recess, the third corner edge arranged closer to the central joint plane E than the fourth corner edge, the first corner edge of the annular groove arranged closer to the central joint plane E than the third corner edge of the recess.

14. A joint assembly according to claim 12, wherein an axial distance between a center of the annular groove and a central joint plane E is greater than an axial distance between a center of the securing ring and the central joint plane E.

* * * * *